Dec. 20, 1949  J. DOLZA ET AL  2,491,483
SCOOP CONTROLLED FLUID COUPLING
Filed May 25, 1944  3 Sheets-Sheet 1

Inventors
John Dolza &
Arthur W. Garibatz
By
Blackmore, Spencer & Oliver
Attorneys Dec. 20, 1949     J. DOLZA ET AL     2,491,483
SCOOP CONTROLLED FLUID COUPLING
Filed May 25, 1944     3 Sheets-Sheet 2

Inventors
John Dolza &
Arthur W. Gaudatz

By Blackmore, Sauer & Hurt
Attorneys

Patented Dec. 20, 1949

2,491,483

UNITED STATES PATENT OFFICE 2,491,483

SCOOP CONTROLLED FLUID COUPLING

John Dolza and Arthur W. Gaubatz, Indianapolis, Ind., assignors to General Motors Corporation, Detroit, Mich., a corporation of Michigan Application May 25, 1944, Serial No. 537,308

3 Claims. (Cl. 60—54)

1

This invention has to do with mechanisms through which one member may be driven from another at speeds which are variable with respect to the speeds of the latter. More particularly, the invention has to do with a fluid coupling for driving the impeller of a supercharger from an engine so that the speed of the impeller may be varied in accordance with the requirement for supercharging.

It is an object of the invention to provide a variable speed fluid coupling in which the fluid through which motion is transmitted from the impeller to the runner of the coupling will not be heated to an unduly high temperature even when the coupling is operating at lower efficiencies.

It is another object of the invention to provide a scoop controlled fluid coupling with a scoop so constructed and arranged that a minimum of force is required to adjust it.

For a better understanding of the objects and nature of this invention reference is made to the following specification and the accompanying drawing wherein there is described and illustrated the preferred embodiment of the invention.

Figure 1:
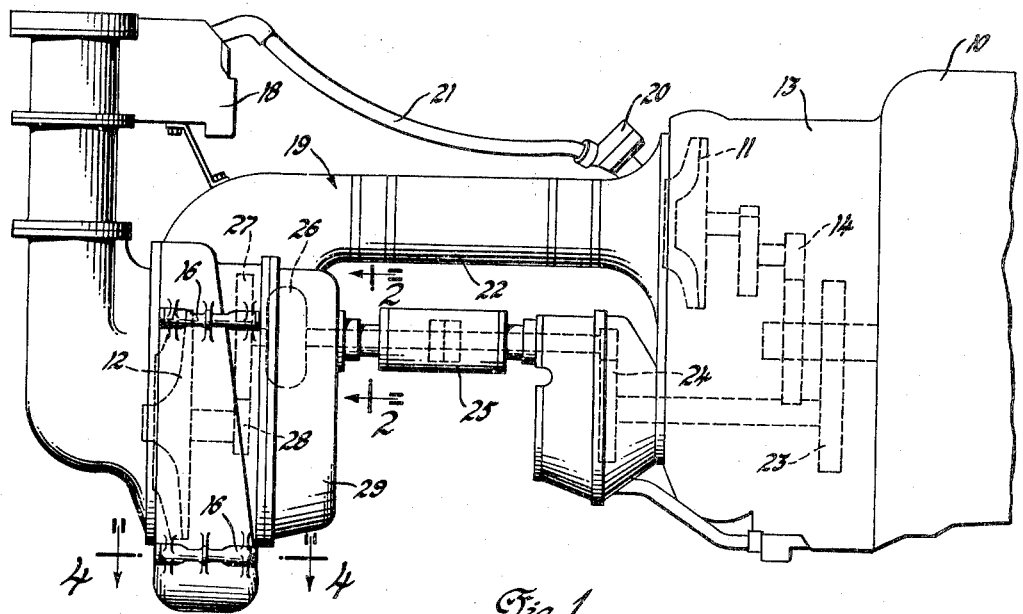
Figure 1 is a more or less diagrammatic view of carbureting apparatus which includes a supercharger driven through a fluid coupling in which our invention is embodied installed on an internal combustion airplane engine.

In the drawing the reference character 10 indicates an internal combustion airplane engine with a main centrifugal supercharger which includes an impeller 11 and an auxiliary centrifugal supercharger which includes an impeller 12. The main supercharger is disposed within a housing 13 which is fixed to the rear end of the engine 10 and its impeller 11 is driven from the crankshaft of the engine at speeds proportionate to the speeds of the engine through gearing which is indicated generally by the reference character 14. The auxiliary supercharger is intended to be mounted in the airplane independently of the engine through rubber bushings 15 interposed between brackets 16 on the auxiliary supercharger

Figure 4:
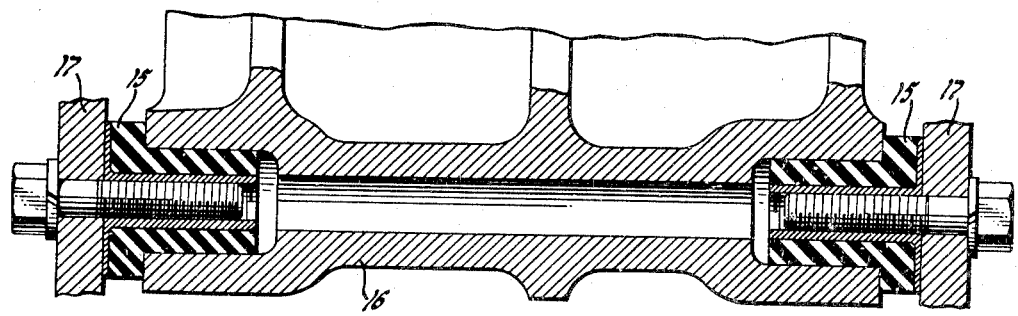
Figure 4 is an enlarged fragmentary section on the line 4—4 of Figure 1.
Figure 2:
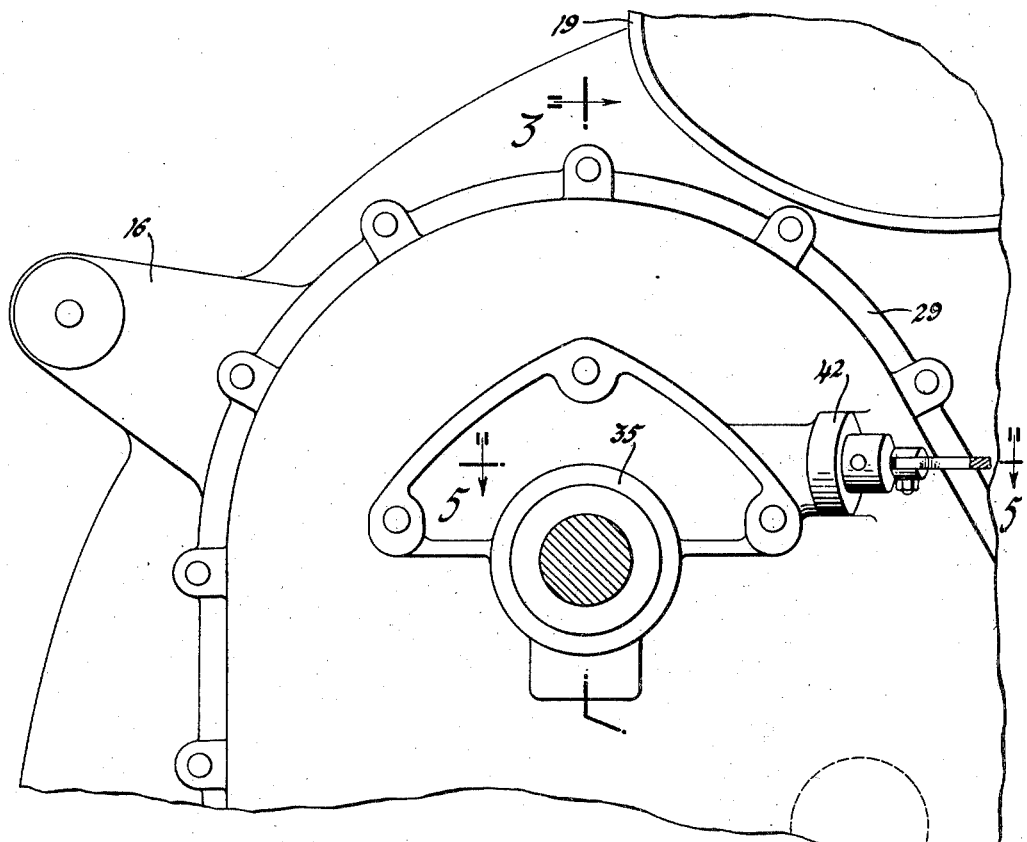
Figure 2 is an enlarged fragmentary view taken as indicated by the line 2—2 of Figure 1.
Figure 5:
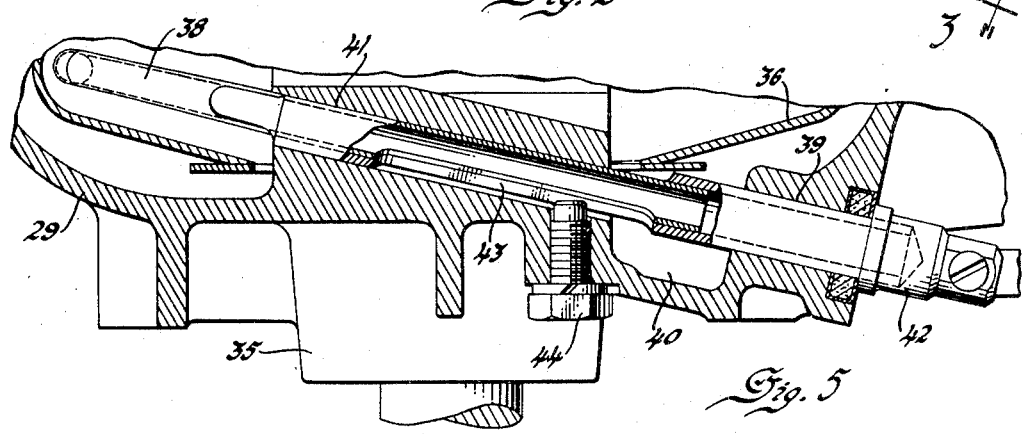
Figure 5 is an enlarged fragmentary section on the line 5—5 of Figure 2.
Figure 6:
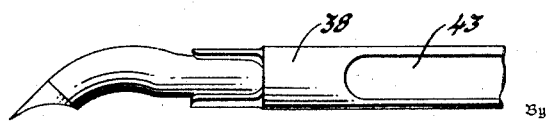
Figure 6 is an elevation of a portion of the scoop included in the fluid coupling.
Figure 3:
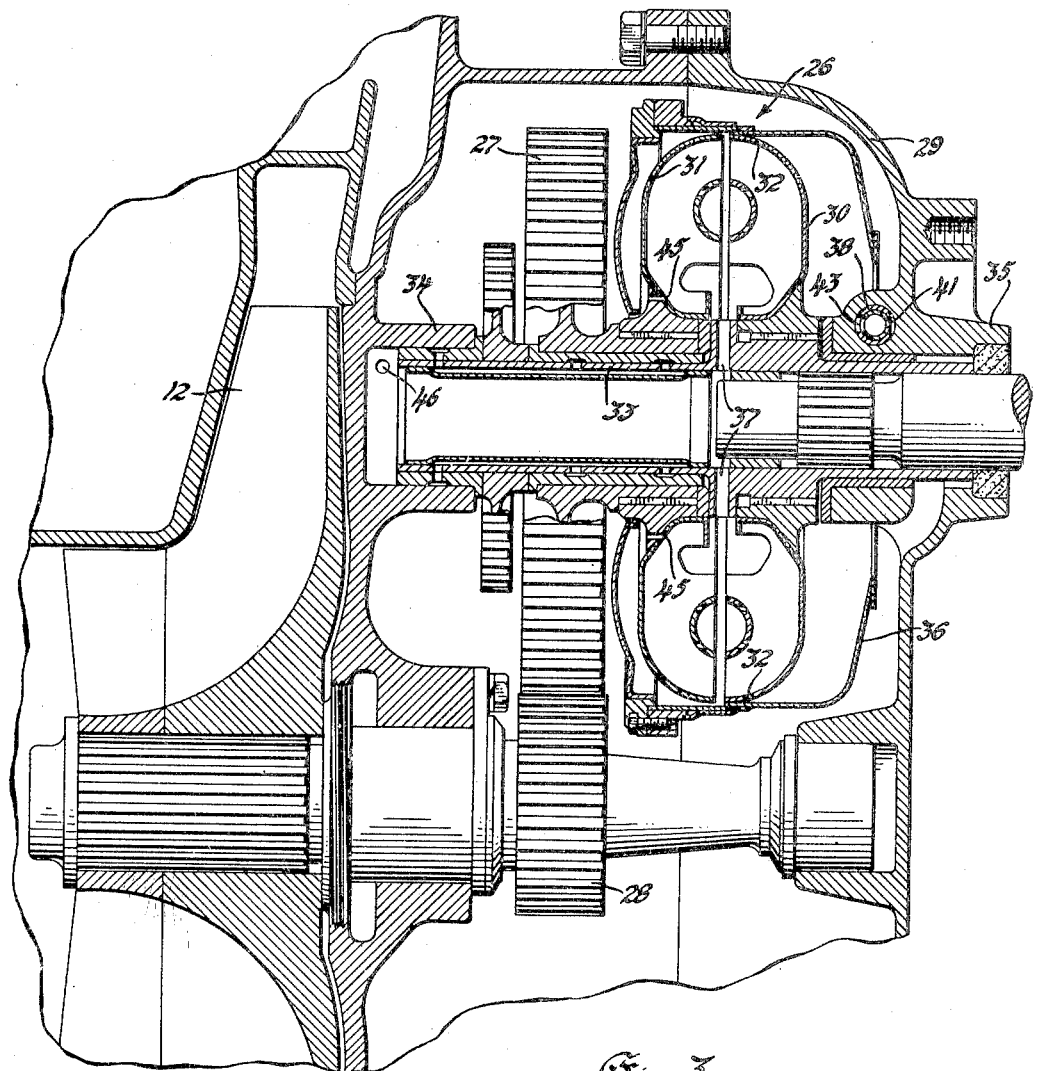
Figure 3 is a section on the line 3—3 of Figure 2.

2 housing and, as indicated in Figure 4, brackets 17 fixed to the fuselage or a bulkhead of the airplane.

To the intake side of the auxiliary supercharger there is connected a fuel metering device 18 carried by the auxiliary supercharger housing which meters fuel at a rate which bears the desired relation to the rate of flow of air through the metering device. From the discharge side of the auxiliary supercharger to the intake side of the main supercharger there extends a duct 19 into which projects immediately in advance of the impeller 11 of the main supercharger a fuel nozzle 20 to which fuel is conducted from the metering device through a tube 21. In the duct 19, there is included a flexible section 22 to accommodate relative movements of the auxiliary supercharger and the engine 10.

The impeller 12 of the auxiliary supercharger is driven from the crankshaft of the engine 10 at speeds which vary in accordance with the requirements for supercharging through elements of the gearing 14, a gear 23, gearing 24, a universal joint 25 to accommodate relative movements of the auxiliary supercharger and the engine, a fluid coupling 26 and gears 27 and 28.

The fluid coupling 26 which is disposed within a housing 29 carried by the auxiliary supercharger housing includes an impeller 30 and a runner 31. Each of the impeller and the runner includes a body shaped like a dished ring with radial vanes on its concave side but the impeller differs from the runner in that there extend through its body near its outer periphery a number of holes 32. The impeller 30 is splined to a hollow shaft 33 which is journalled in bearings installed in hollow bosses 34 and 35 on the housing 29 and splined to the output shaft of the universal joint 25. The runner 31 is splined to the hub of the gear 27 which is mounted so that it can rotate on the hollow shaft 33 and meshes with the gear 28 which is splined to the shaft to which is splined the impeller 12 of the auxiliary supercharger. To the body of the impeller 30 of the fluid coupling is fixed by a fluid-tight bond what may be referred to as trough-shaped shroud 36 which encloses the impeller 30 and the runner 31. The runner-side side wall of the shroud is spaced laterally from the runner and its inner edge extends to a running fit with the hub of the runner. The impeller-side side wall of the shroud is spaced considerably farther laterally from the impeller than the runner-side wall is from the runner and encircles the inwardly projecting portion of the boss 35 with its inner edge spaced from it at its point of maximum diameter.

To supply fluid to the coupling 26 there is provided a duct, which is not shown in the drawing, through which the oil discharged through the pressure relief valve in the lubricating system of the engine 10 is conducted into a bore 46 in the hollow boss 34 and, thence, into the interior of the hollow boss. This oil passes from the interior of the hollow boss 34 into the hollow shaft and, thence, through radial bores 37 in the hollow shaft to between the impeller 30 and the runner 31.

To conduct the oil from the coupling 26, there is provided a scoop 38 which extends from without the housing 29 to within the shroud 36 on its impeller side through a bore 39 in the outer wall of the housing, a cavity 40 which opens into the interior of the housing and a bore 41 in an enlargement on the upper side of the inwardly projecting portion of the boss 35. The scoop 38 is a tube-like member closed at its outer end by a cap 42 and shaped at its inner end so that the opening therein faces oppositely to the direction of rotation of the coupling 26. In one side of the scoop 38 there is a slot 43 which opens into the cavity 40 in any position of the scoop and into which projects the end of a screw 44 which serves to prevent rotation of the scoop.

When the engine 10 is operating, the impeller 30 of the coupling 26 is, through elements of the gearing 14, the gear 23, the gearing 24 and the universal joint 25, driven at speeds proportionate to the speeds of the engine. Also, when the engine 10 is operating, oil from the lubricating system of the engine passes at rates approximately proportionate to the speed of the engine through the coupling 26 and, thence, into the interior of the housing 29 whence it is removed by the lubricating oil scavenging pump of the engine. Neglecting that which leaks from the runner side of the shroud through the clearance between its inner periphery and the hub of the runner, the path of the oil from between the impeller 30 and the runner 31 into the interior of the housing 29 is, through the openings 32 in the body of the impeller, the impeller side of the shroud 36, the scoop 38, the slot 43 in the scoop and the cavity 40. The small bores 45 which extend through the hub and the body of the runner near the inner periphery of the latter permit escape of air from between the impeller and the runner into the runner side of the shroud 36 and, thence, through the clearance between the inner periphery of the runner side of the shroud and the hub of the runner, into the interior of the housing 29 and, thus, prevent air lock of the coupling.

The scoop 38 may be moved endwise to vary the depth to which it extends into the shroud 36 and thus the depth at which oil is maintained in the shroud and between the impeller 30 and the runner 31, the efficiency of the coupling and the speed of the impeller of the auxiliary supercharger with respect to the speed of the engine. To move the scoop endwise so that the speed of the impeller of the auxiliary supercharger will vary in accordance with the requirement for supercharging there is connected to the cap 42 a suitable controller which is not shown in the drawing.

The constant removal of oil from the coupling and replacement of it by cooler oil at an adequate rate minimizes the heating of the coupling. The manner of introduction of the oil into the coupling and of its transfer from between the impeller and the runner into the shroud further contributes to the minimization of the heating of the coupling. The endwise movable scoop affords the advantage that less power is required to make the adjustments of it which are necessary to effect changes in the speeds of the runner with respect to the speeds of the impeller of the coupling.

We claim:

1. In a fluid coupling, an impeller, a runner, a shroud which encloses the impeller and the runner and is rotatable with the impeller, a housing which encloses and is spaced from the shroud, openings in the impeller through which fluid may pass from between the impeller and the runner into the impeller side of the shroud, and means for transferring fluid from the impeller side of the shroud into the housing, including a tube-like scoop which extends from within the impeller side of the shroud through the space between the housing and the shroud to without the housing and opens into the impeller side of the shroud and the space between the housing and the shroud and is movable endwise in the housing.

2. In a fluid coupling, an impeller, a runner, a chamber which is rotatable with the impeller and into which fluid passes from between the impeller and the runner, a housing which encloses the impeller, the runner and the chamber and is spaced from the chamber, and means for transferring fluid from the chamber into the housing, including an endwise movable scoop which extends from without the housing, through the space between the housing and the chamber, into the chamber and has in it a duct which opens into the chamber and the space between the housing and the chamber.

3. In a fluid coupling, an impeller, a runner, a chamber into which fluid passes from between the impeller and the runner, a housing which encloses the impeller, the runner and the chamber and is spaced from the chamber, and means for transferring fluid from the chamber into the housing, including an endwise movable scoop which extends from without the housing, through the space between the housing and the chamber, into the chamber and has in it a duct which opens into the chamber and the space between the housing and the chamber.

JOHN DOLZA.
ARTHUR W. GAUBATZ.

REFERENCES CITED

The following references are of record in the file of this patent:

UNITED STATES PATENTS

| Number | Name | Date |
|---|---|---|
| 1,987,985 | Bauer | Jan. 15, 1935 |
| 2,127,738 | Kugel | Aug. 23, 1938 |
| 2,156,040 | Duffield | Apr. 25, 1939 |
| 2,187,656 | Kiep et al. | Jan. 16, 1940 |
| 2,187,667 | Sinclair | Jan. 16, 1940 |
| 2,264,341 | Sinclair | Dec. 2, 1941 |
| 2,281,161 | Kuhns | Apr. 28, 1942 |
| 2,352,109 | Leary | June 20, 1944 |
| 2,377,851 | Blank | June 12, 1945 |